July 25, 1967  J. C. FREDLEY ETAL  3,332,761
METHOD OF ANNEALING SHEETS OF GLASS ON A DECREASING
TEMPERATURE GAS SUPPORT
Original Filed Nov. 9, 1962  17 Sheets-Sheet 2

INVENTORS
JAMES C. FREDLEY and
GEORGE E. SLEIGHTER
BY
Oscar L Spencer
ATTORNEY

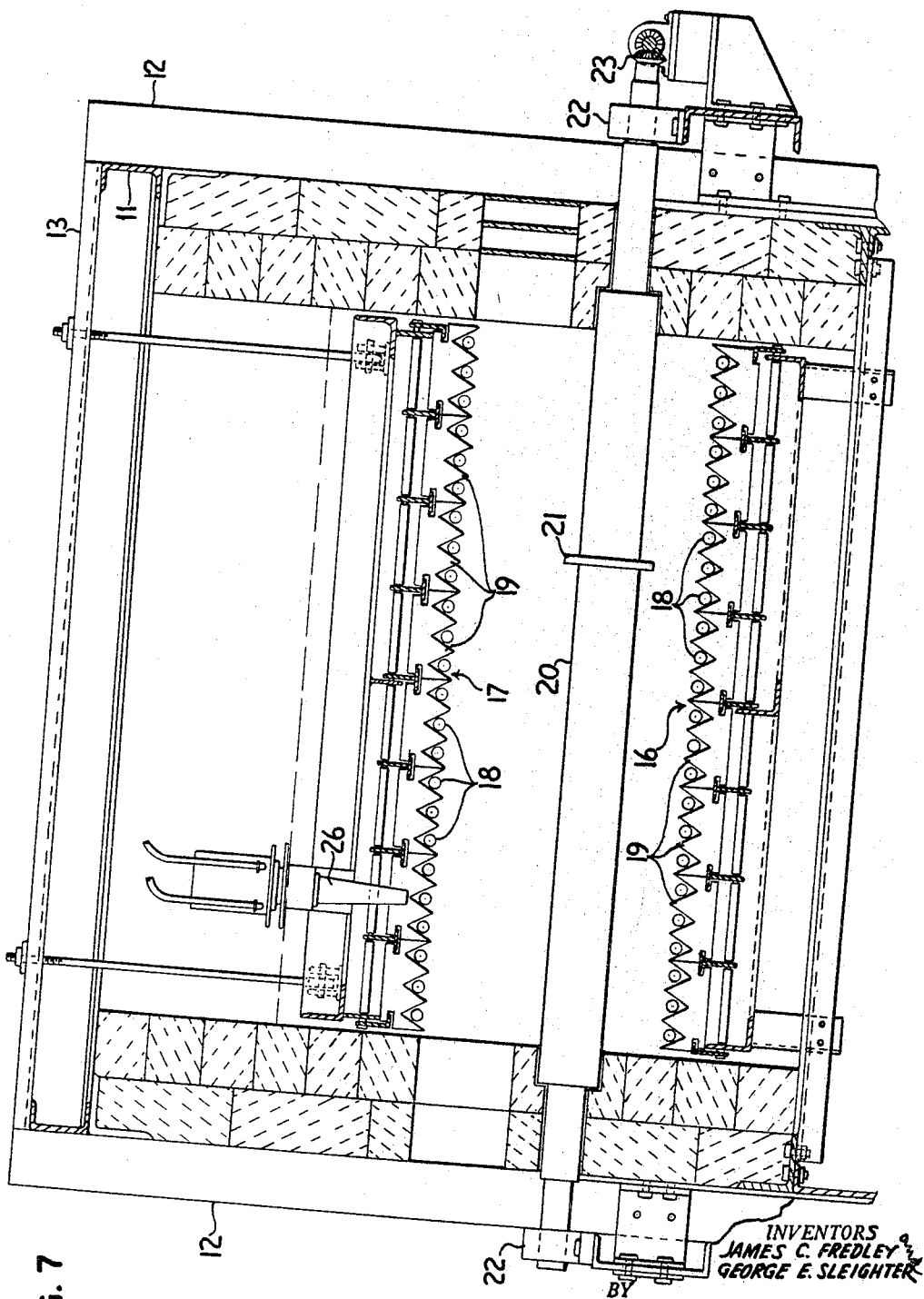

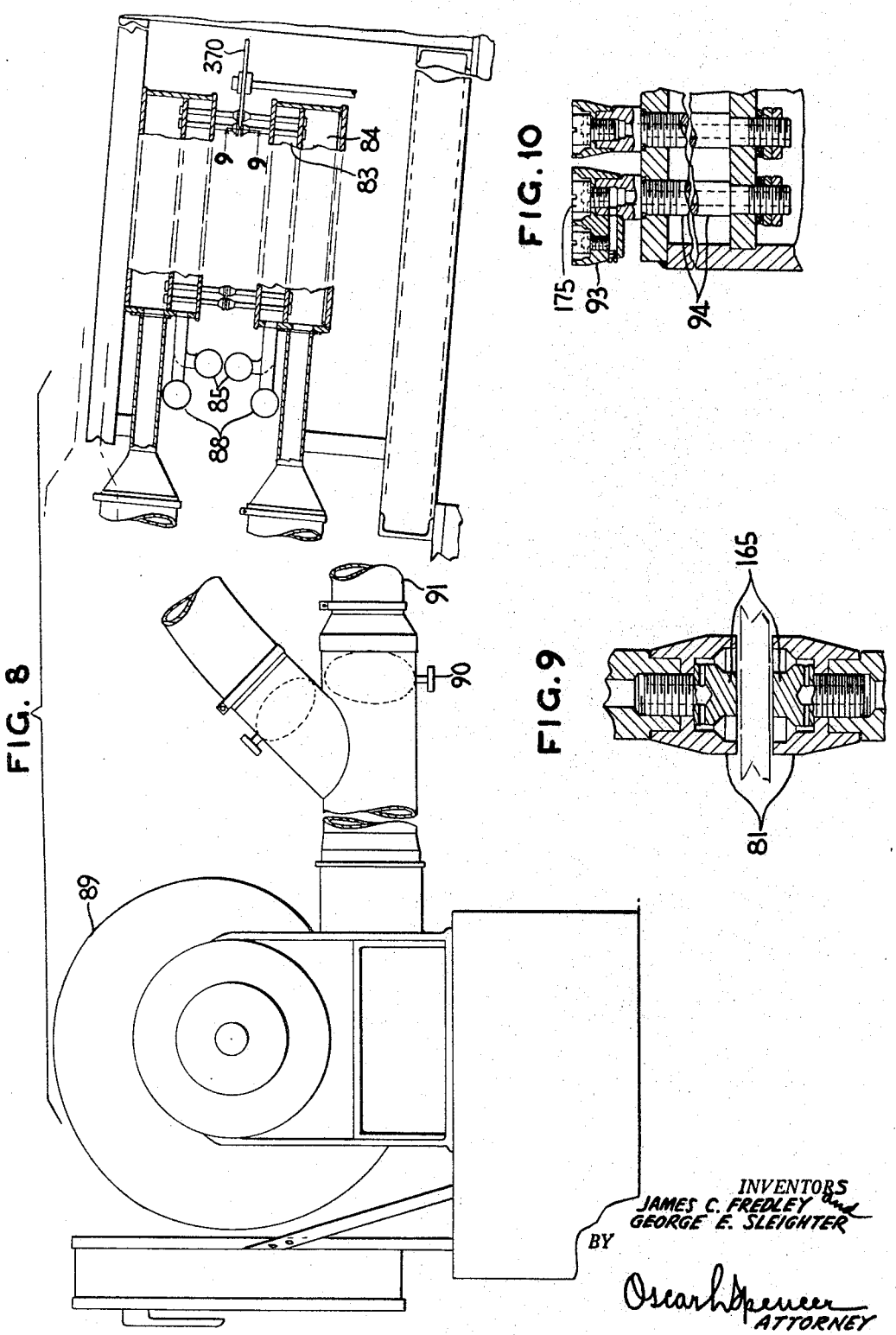

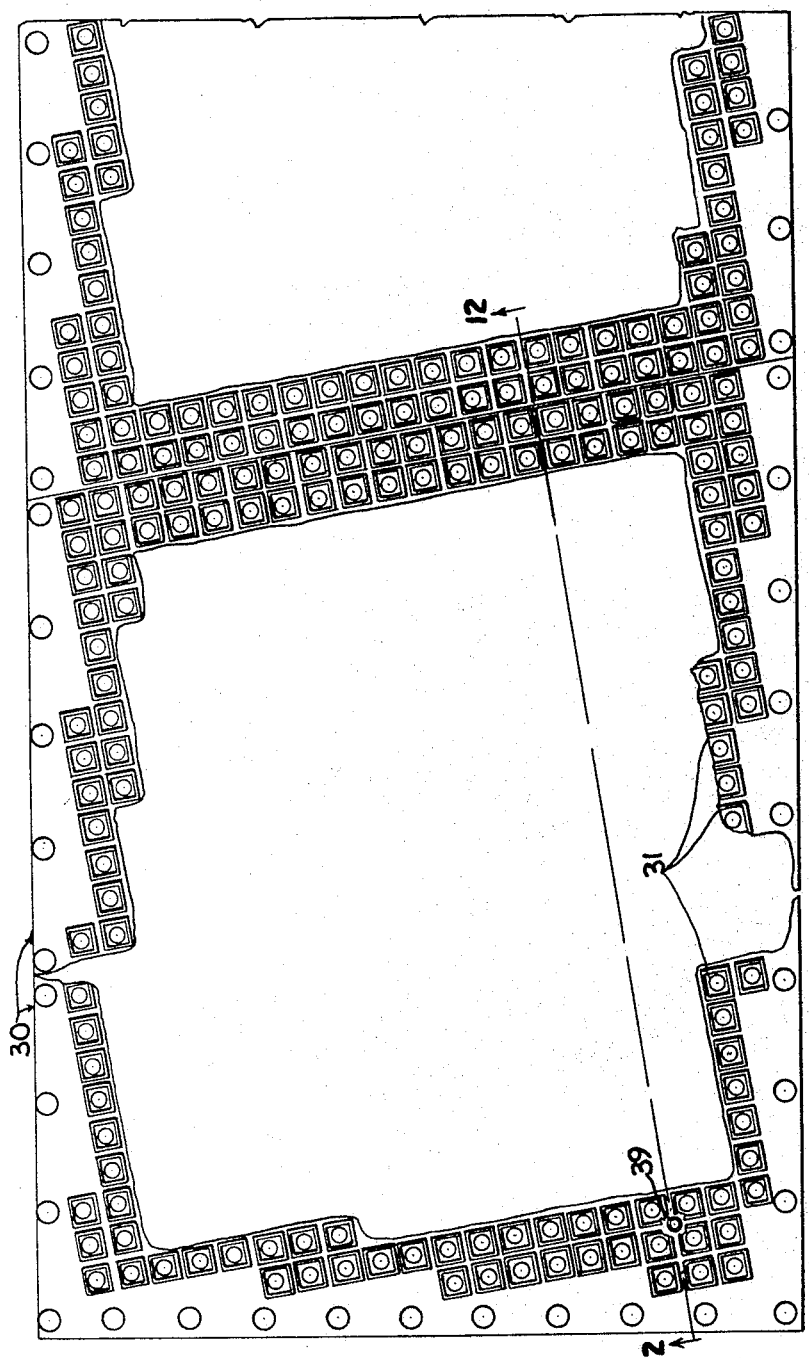
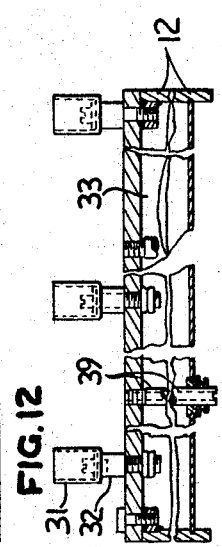
FIG. 11
FIG. 12
INVENTORS
JAMES C. FREDLEY and
GEORGE E. SLEIGHTER
BY
Oscar h Spencer
ATTORNEY

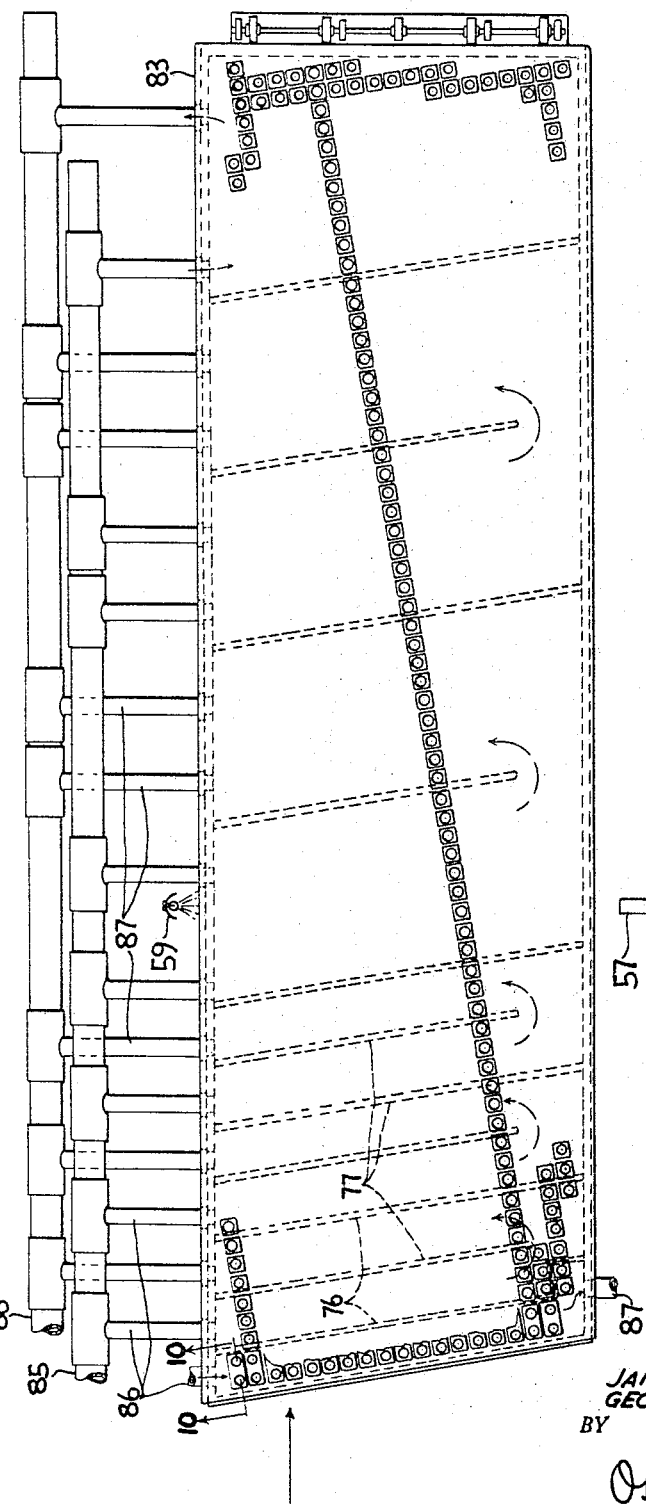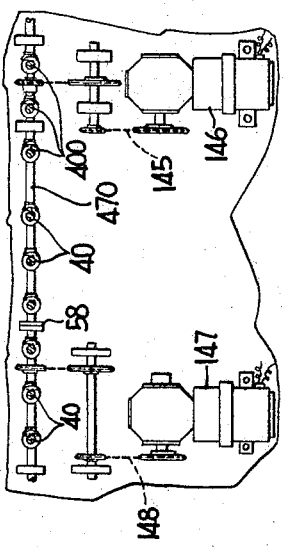

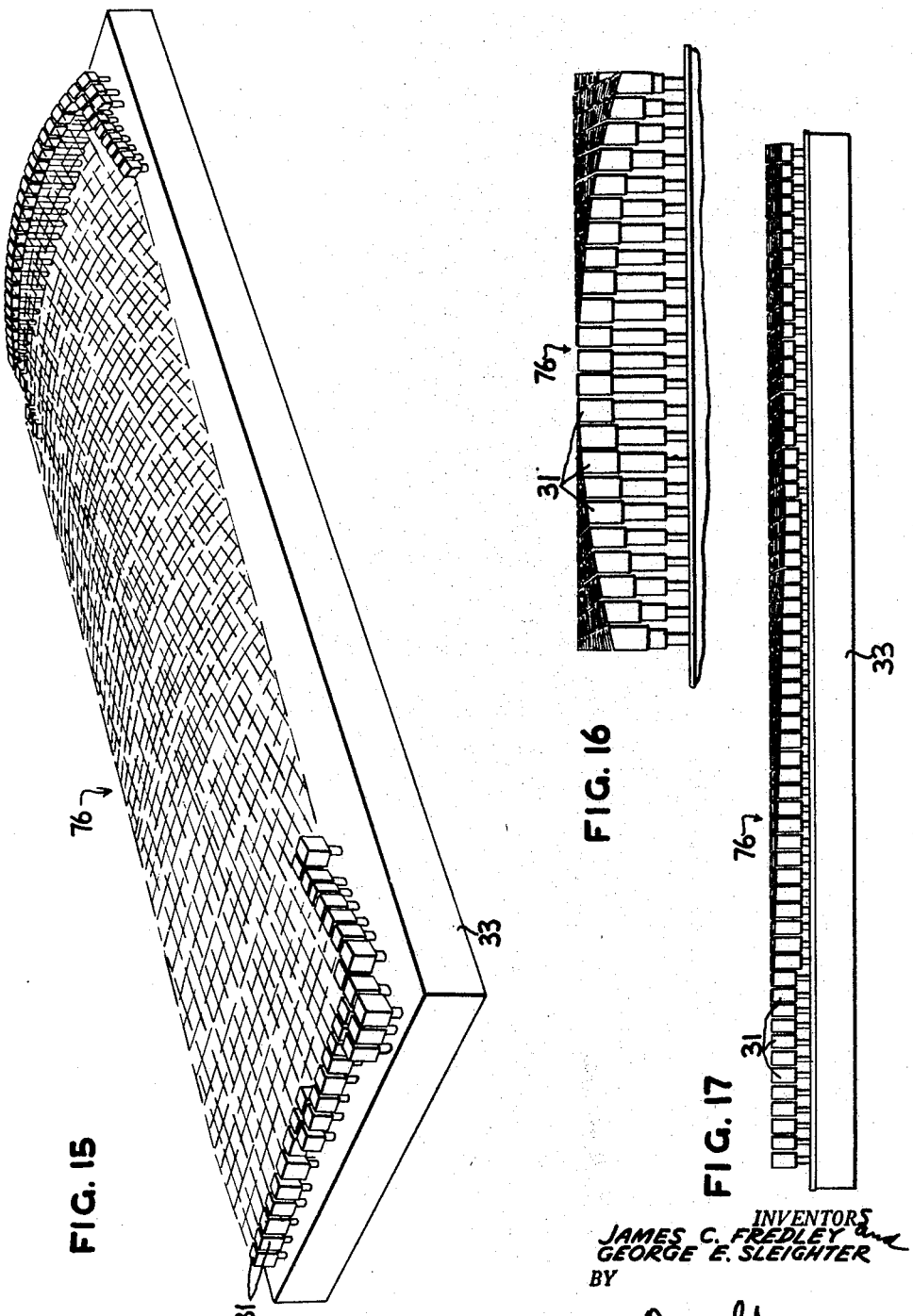

INVENTORS
JAMES C. FREDLEY and
GEORGE E. SLEIGHTER
BY
Oscar L. Spencer
ATTORNEY

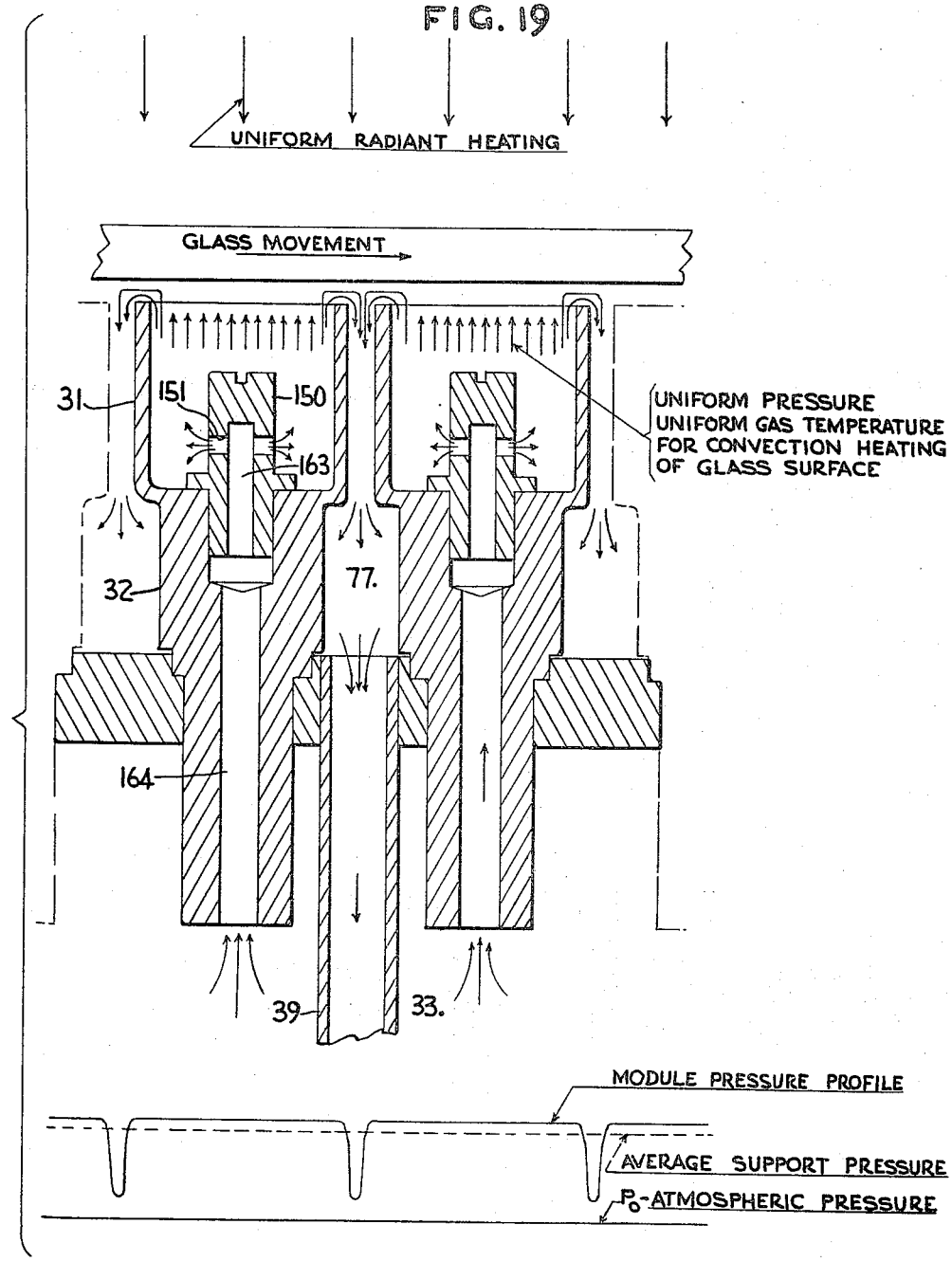

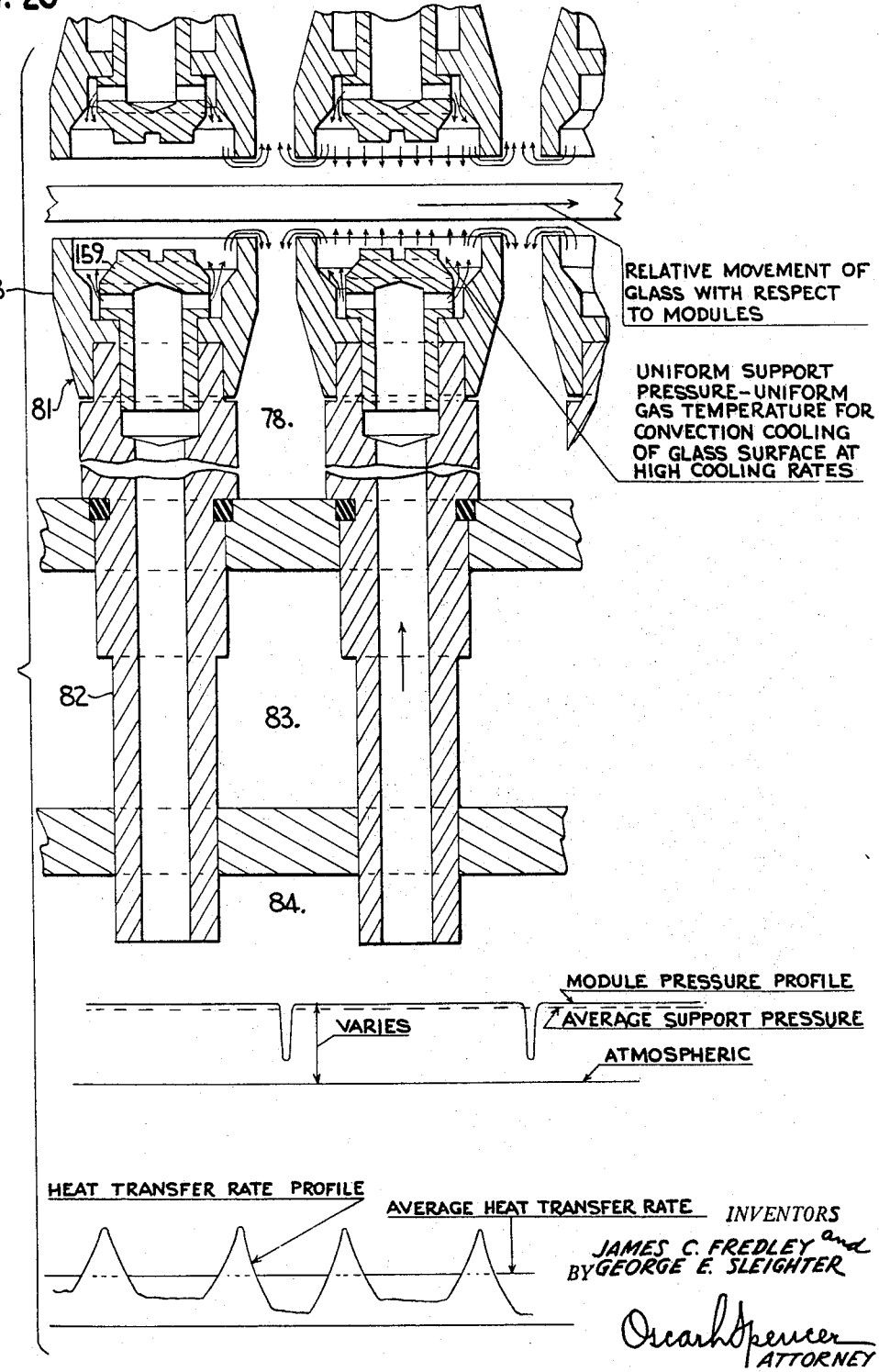

July 25, 1967  J. C. FREDLEY ETAL  3,332,761
METHOD OF ANNEALING SHEETS OF GLASS ON A DECREASING
TEMPERATURE GAS SUPPORT
Original Filed Nov. 9, 1962  17 Sheets-Sheet 15
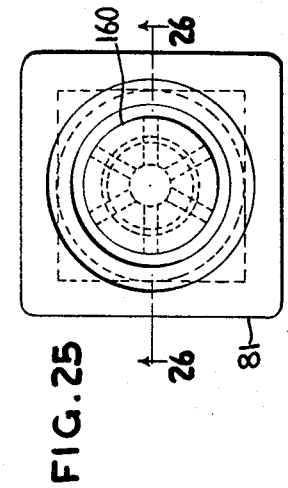
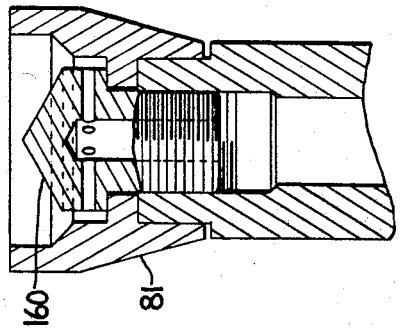
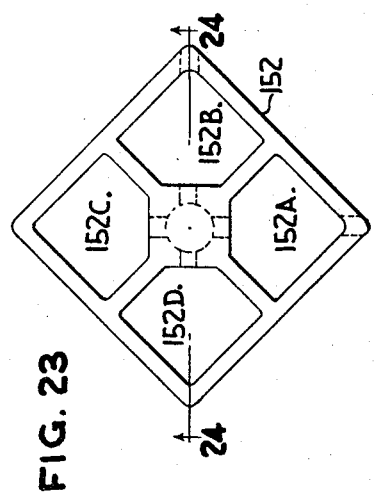
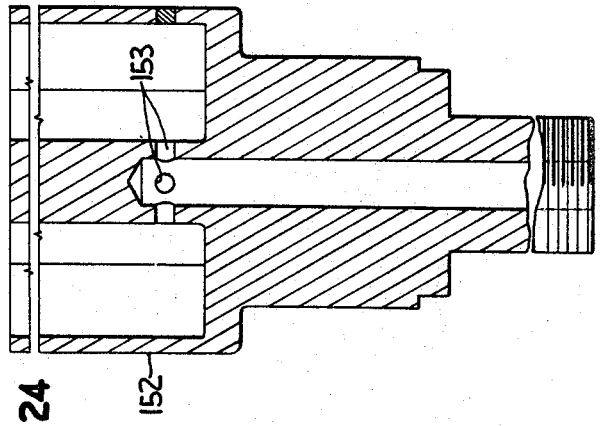
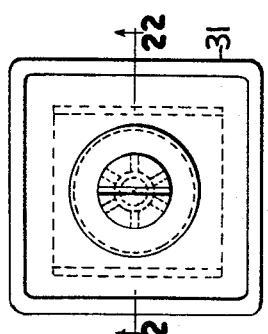
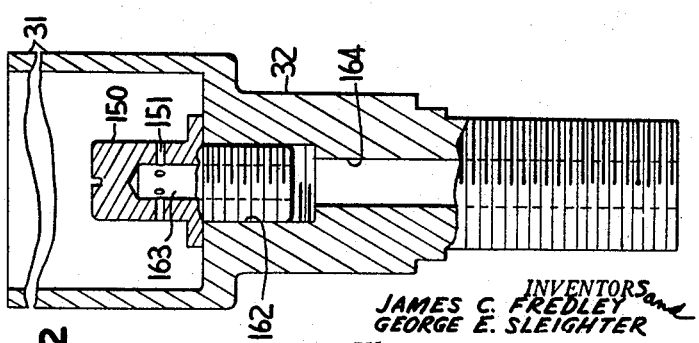
INVENTORS
JAMES C. FREDLEY and
GEORGE E. SLEIGHTER
BY
Oscar H. Spencer
ATTORNEY INVENTORS
JAMES C. FREDLEY and
GEORGE E. SLEIGHTER
BY
Oscar L Spencer
ATTORNEY July 25, 1967  J. C. FREDLEY ETAL  3,332,761
METHOD OF ANNEALING SHEETS OF GLASS ON A DECREASING
TEMPERATURE GAS SUPPORT
Original Filed Nov. 9, 1962  17 Sheets-Sheet 17

INVENTORS
JAMES C. FREDLEY and
GEORGE E. SLEIGHTER
BY
Oscar H. Spencer
ATTORNEY

3,332,761
METHOD OF ANNEALING SHEETS OF GLASS ON A DECREASING TEMPERATURE GAS SUPPORT

James C. Fredley, Tarentum, and George E. Sleighter, Natrona Heights, Pa., assignors to Pittsburgh Plate Glass Company, Pittsburgh, Pa., a corporation of Pennsylvania
Original application Nov. 9, 1962, Ser. No. 236,676, now Patent No. 3,223,501, dated Dec. 14, 1965. Divided and this application Oct. 22, 1965, Ser. No. 502,670
4 Claims. (Cl. 65—25)

This application is a division of our copending application, Ser. No. 236,676, now Patent Number 3,223,501 entitled, "Fabrication of Glass," filed Nov. 9, 1962, which in turn was a continuation-in-part of our copending application Ser. No. 236,103, filed Nov. 7, 1962, now abandoned, which application is, in turn, a continuation-in-part of our copending application Ser. No. 209,456, filed July 12, 1962, now abandoned, which application is, in turn, a continuation-in-part of our copending application Ser. No. 185,757, filed Apr. 6, 1962, now abandoned, which application is, in turn, a continuation-in-part of our copending application Ser. No. 172,235, filed February 9, 1962, which application is, in turn, a continuation-in-part of our copending application Ser. No. 139,901, filed Sept. 22, 1961, now abandoned. Reference is also made to our copending applications Ser. No. 139,902, filed Sept. 22, 1961, now abandoned; Ser. No. 140,135, filed Sept. 22, 1961, now abandoned; Ser. No. 175,938, filed Feb. 27, 1962, now abandoned; Ser. No. 176,050, filed Feb. 27, 1962, now abandoned; Ser. No. 178,997, filed Mar. 12, 1962, now abandoned; Ser. No. 185,448, filed Apr. 5, 1962, now abandoned; and Ser. No. 195,773, filed May 18, 1962, now abandoned, all of which applications are directed to related subject matter. All of the aforesaid applications referred to herein pursuant to 35 U.S.C. 120, are assigned to the assignee of this application.

This invention relates to the fabrication of glass and more particularly to heating of glass and to the transportation and/or support of hot glass sheets, especially glass at a deformation temperature. It is particularly concerned with such a process when combined with another operation such as annealing such sheets.

Sheets of glass may be fabricated through known manufacturing techniques of bending, tempering, annealing or coating and combinations of such techniques to form end products having characteristics and uses different from the original product. A common feature of these techniques is the heating of glass sheets to a temperature above that at which the major surfaces or the contour thereof will be changed by a deforming stress or contact with solids, hereinafter referred to as deformation temperature. For most plate and window glass this temperature is around 980 degrees Fahrenheit and above, but usually below a temperature at which the glass becomes molten.

Economic utilization of fabricating equipment requires that the glass sheets undergoing treatment be conveyed while hot.

The necessity of conveying glass at high temperature has heretofore resulted in undesirable deformation or marring of the major surfaces of glass sheets being treated due to physical contact with supporting and conveying apparatus while the glass is at elevated temperatures. The instant invention overcomes this defect common to the know methods of heat treating glass sheets. In addition, this invention overcomes further disadvantages peculiar to some of the individual fabricating techniques.

Included in the instant invention are new and useful methods and apparatus for supporting and conveying hot glass. More specifically, methods and apparatus have been devised for supporting and conveying a sheet of glass on a film of gas while the glass is at or above deformation temperature. The film of gas uniformly supports the glass against undesired deformation and eliminates the necessity of contact of the major surfaces of the glass sheet with any solid object while the glass is subject to deformation or impairment. In this manner, the marring or distorting now associated with current flat glass fabricating processes has been eliminated.

In known processes of annealing, glass exhibiting undesirably high internal stresses is conveyed on rollers through a lehr where it is reheated substantially to its upper annealing range to allow stresses to relax and is then cooled in a controlled manner through the lower limit of its annealing range. The nonuniform support and the unavoidable slippage between the rollers and the softened glass results in distortion and surface marring of the sheets. In the manner herein disclosed, glass may be reheated and annealed without the attendant disadvantages of the known processes. This is accomplished by supporting and conveying the heated sheets of glass along a gas film bed which provides uniform support without physical contact with the major surfaces of the glass.

In accordance with an embodiment of the invention, there is provided a plurality of evenly distributed zones of uniform nominal pressure on the lower side of the sheet adequate to support the sheet element undergoing treatment. Gas flows from a reservoir under higher pressure into such zones, being uniformly throttled between the reservoir and each zone to restrict the passage of gas between the two. Each zone constitutes a unit of support area with respect to the sheet to be supported and each has a reference surface at its margins common to the remainder. Within each zone, gas entering from the reservoir is diffused after throttling so as to avoid creation of localized jets normal to the reference surface and otherwise to equalize pressure and flow under normal conditions of operation. Provision is made for escape of the flow of gas emanating from each zone when covered by glass. In operation, the rate of flow of gas from the reservoir to each zone is maintained at such level that the average clearance between the reference surface and the glass sheet being supported is not less than 0.001 inch and not greater than 0.050 inch, normally not greater than 0.025 inch for glass having a thickness of ⅛ inch and above, and in any case never more than 50 to 90 percent of the thickness of the supported glass.

More particularly, the invention contemplates such a gas support system in which glass is introduced onto the support area at a temperature below that at which its major surfaces will mar on physical contact with solid objects, the glass is heated above deformation temperature while supported primarily by gas and is then cooled until below deformation temperature before removal from the gas support. The system is particularly well adapted to heating flat glass in the form of sheets or the like in which the thickness ranges up to ½ to one inch and the length and breadth of the sheet generally are over 6 inches or one foot to as much as 5 or 10 feet or greater, optionally bending it by travel over a curved bed, then rapidly cooling the surfaces or quenching by utilizing relatively cold gas as the support medium, supplementing the cooling effect on the supported side by complementary flow of cold gas against the opposite side to equalize the heat transfer from the two major surfaces until the entire body is cool enough to prevent loss of temper or, in other words, redistribution of the stress differential set up between the surfaces and the interior of the glass body by differential rates of cooling.

Advantageously, heating of glass upon the gas support is accomplished by burning a controlled admixture of gas and air, introducing the hot products of combustion to the reservoir or plenum chamber which supplies the supporting zones, and supplementing the heat thus supplied to the glass by radiant heat from an independently controlled source or sources which are generally disposed on the side of the glass opposite the supported side.

The attendant advantages of this invention and the various embodiments thereof will be readily appreciated as the same become better understood by reference to the following detailed description when considered in connection with the accompanying drawings in which:

FIG. 1 is a perspective, partly schematic, view illustrating a system for conveying, heating and quenching sheet glass parts embodying several features of the present invention; FIG. 1-A is another partly schematic perspective on a larger scale illustrating particularly how sheet glass parts are driven by discs contacting an edge of the part while it is otherwise supported entirely by a gas film over the inclined bed of FIG. 1;

FIG. 7 is a sectional view-partly in elevation taken along the line 7—7 of FIG. 1;

FIG. 8 is a schematic view showing the arrangements for supplying air and cooling water to the quenching heads;

FIG. 9 is an approximately full scale sectional detail illustrating elements of quenching module design and patterns of air flow during operation;

FIG. 10 is a sectional detail showing the arrangement for supplying air to those quenching modules in the row next adjacent to the heating section;

FIG. 11 is a partially detailed plan view of the first and second beds in the gas support heating section showing the relationship of the individual modules in the geometry of the mosaic;

FIG. 12 is a sectional view taken along line 12—12 of FIG. 11, showing the relationship of the modules and exhaust ducts to the bed plate and plenum chamber;

FIG. 13 is an enlarged partial plan view of the lower quenching bed of FIG. 4;

FIG. 14 shows the arrangement used to vary the speed of the conveyor drive during the run out of parts from the heating to the quenching section;

FIG. 15 is a perspective view showing a gas film support bed, the generative surface of which progressively changes in contour from flat to a cylindrical shape in a cross section normal to the longitudinal axis of the bed;

FIG. 16 is an end elevation of the bed of FIG. 15 looking toward the part of maximum curvature;

FIG. 17 is a side elevation of the bed of FIG. 15 showing how the curve is developed along the path of travel of the glass;

FIG. 19 is a schematic view on enlarged scale of a section of the gas support bed showing diagrammatically the flow and exhaust of the support gases and presenting diagrammatic graphs in conjunction therewith;

FIG. 20 is a view similar to FIG. 19, presenting diagrammatic graphs and flows in conjunction with the quenching system;

FIG. 21 is a plan view approximately double scale illustrating a prototype support module unit;

FIG. 22 is a section taken along the line 22—22 of FIG. 21;

FIG. 23 is a plan view double scale of an improved support module unit, simpler of fabrication and in which the support area is subdivided by partitions;

FIG. 24 is a section taken along lines 24—24 of FIG. 23;

FIG. 25 is a plan view approximately double scale of a typical quenching module unit;

FIG. 26 is a section taken along lines 26—26 of FIG. 25;

Figure 1:
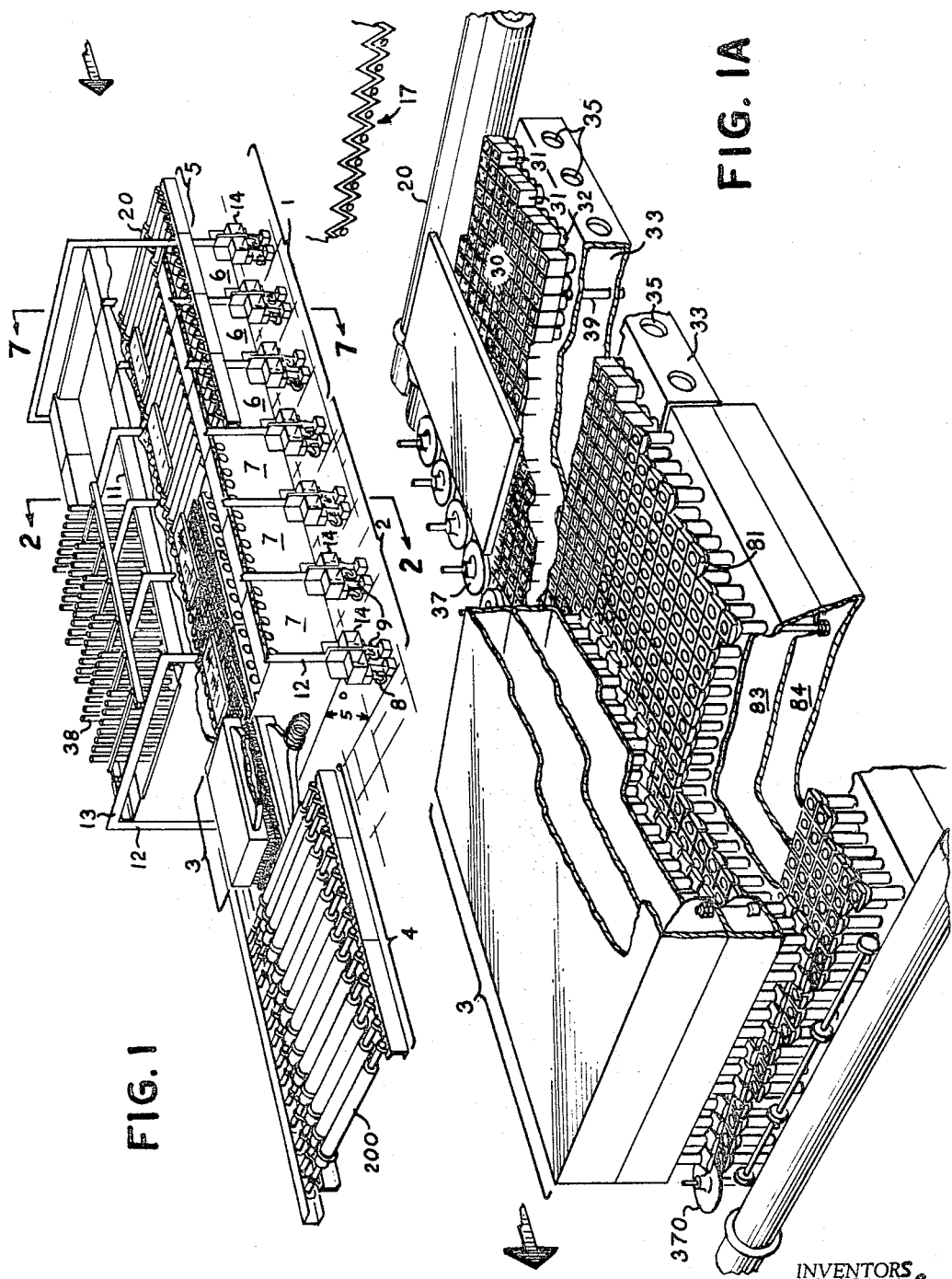
Figure 2:
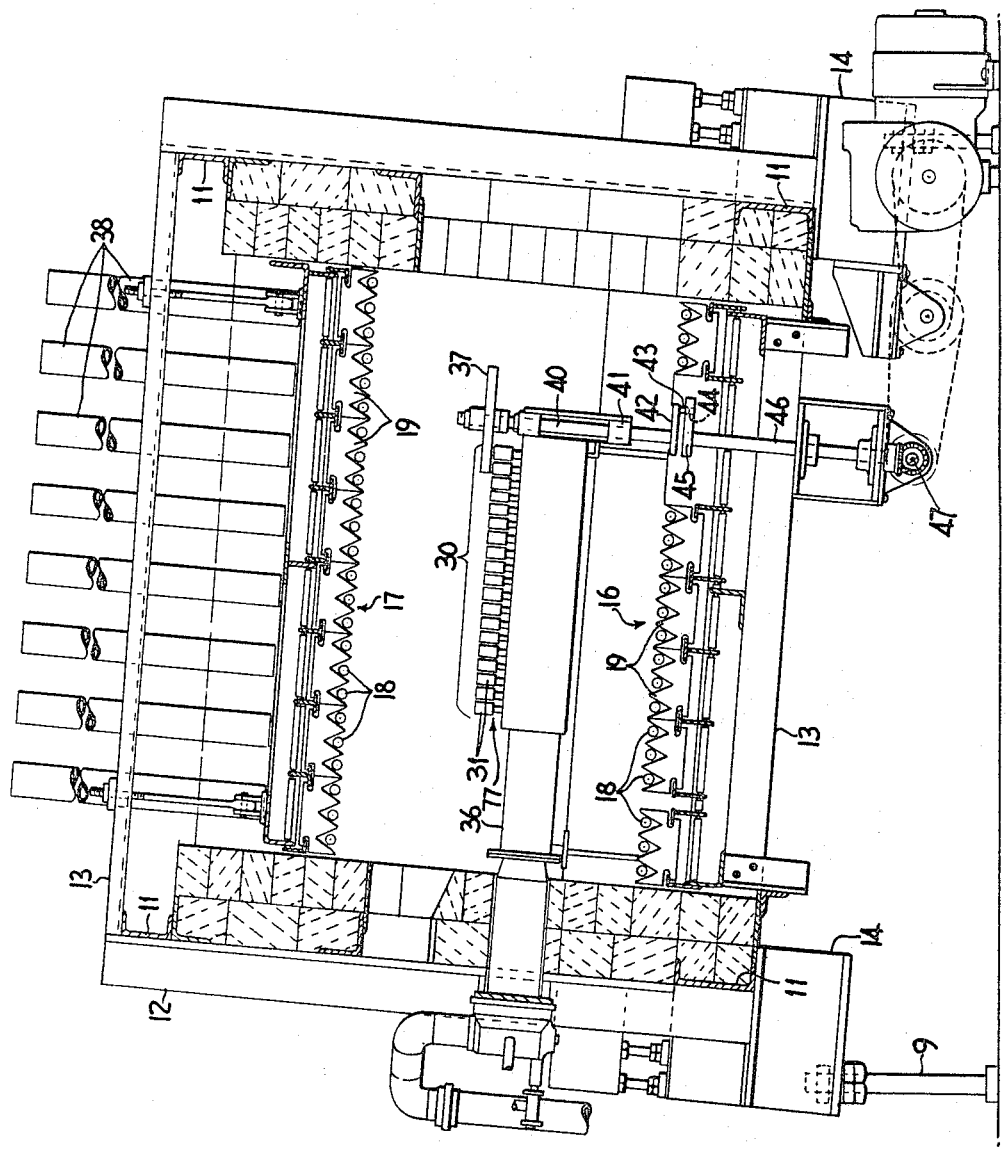
FIG. 2 is a detailed view partly in section and partly in elevation taken along the line 2—2 of FIG. 1.

Referring to the drawings, FIG. 1 illustrates a system advantageously employed for heating flat glass parts up to or above the deformation temperature, e.g., to a temperature at which the glass can be tempered, quenching such parts while hot and delivering the parts thus tempered onto a roll conveyor for removal. The component sections making up the complete system consist of a preheat section 1 wherein the glass is conveyed on rollers between radiant heaters to preheat the glass until brought to a suitable preheat temperature under the deformation temperature; a gas film support heating section 2, where the glass parts are transferred to, and supported on, a film of hot gas while being conveyed through a frictional drive contacting the edges only of such parts, supplemental heat being supplied by radiant heat sources above and below the glass until the glass reaches a temperature high enough for tempering purposes; a quenching section 3, where the glass is rapidly chilled while suspended between opposed flowing films of cool air, edge contact driving being continued through the section, and a delivery roll system 4 which receives the tempered glass parts from the quenching system and conveys them to their next destination.

Preheat section 1 includes an apron roll unit 5 for loading, the first few rolls being idle and the last driven. Next in order of the direction of travel of the workpiece are three identical enclosed preheat units 6 followed by three enclosed hot gas support heating units 7, the quenching section 3 and the delivery section 4.

For ease in fabrication, all units 5, 6, 7 and sections 3 and 4 are assembled within rectilinear frameworks of support and mounted on casters 8 for convenience in assembly. Each unit and section is elevated from the casters 8 by jacks 9 into a position with the surfaces of all rolls and the gas support beds in a common plane tilted in a sidewise direction at an angle of five degrees with respect to the horizon as shown in FIGS. 1, 2, 6 and 7. The essential framework consists of girders 11, stanchions 12, and beams 13 resting on support blocks 14.

THE PREHEAT SECTION

Each unit 6 of the preheat section includes a radiant floor 16 and a radiant roof 17 built up from individual electrical heating units consisting of heating coils 18 disposed in ceramic holders 19. Control is afforded so that each unit 6 may be regulated as to temperature across the path of travel and parallel thereto. Each unit is provided with a thermocouple (not shown) to sense the temperature of the unit and the glass and to actuate the unit to the extent necessary to supply the required amount of heat. Conveyor rolls 20 are provided with guide collars 21 in alignment throughout the section 1 so as to position the glass properly for transfer to the gas support next following. Each roll is journaled in bearings 22 and is driven through gears 23 from a common shaft 24 energized by drive motor 25. Temperature sensing devices 26 (FIG. 7) placed at intervals along the path of travel of the workpiece afford data from which to establish control.

GAS FILM SUPPORT HEATING SECTION

Figure 3:
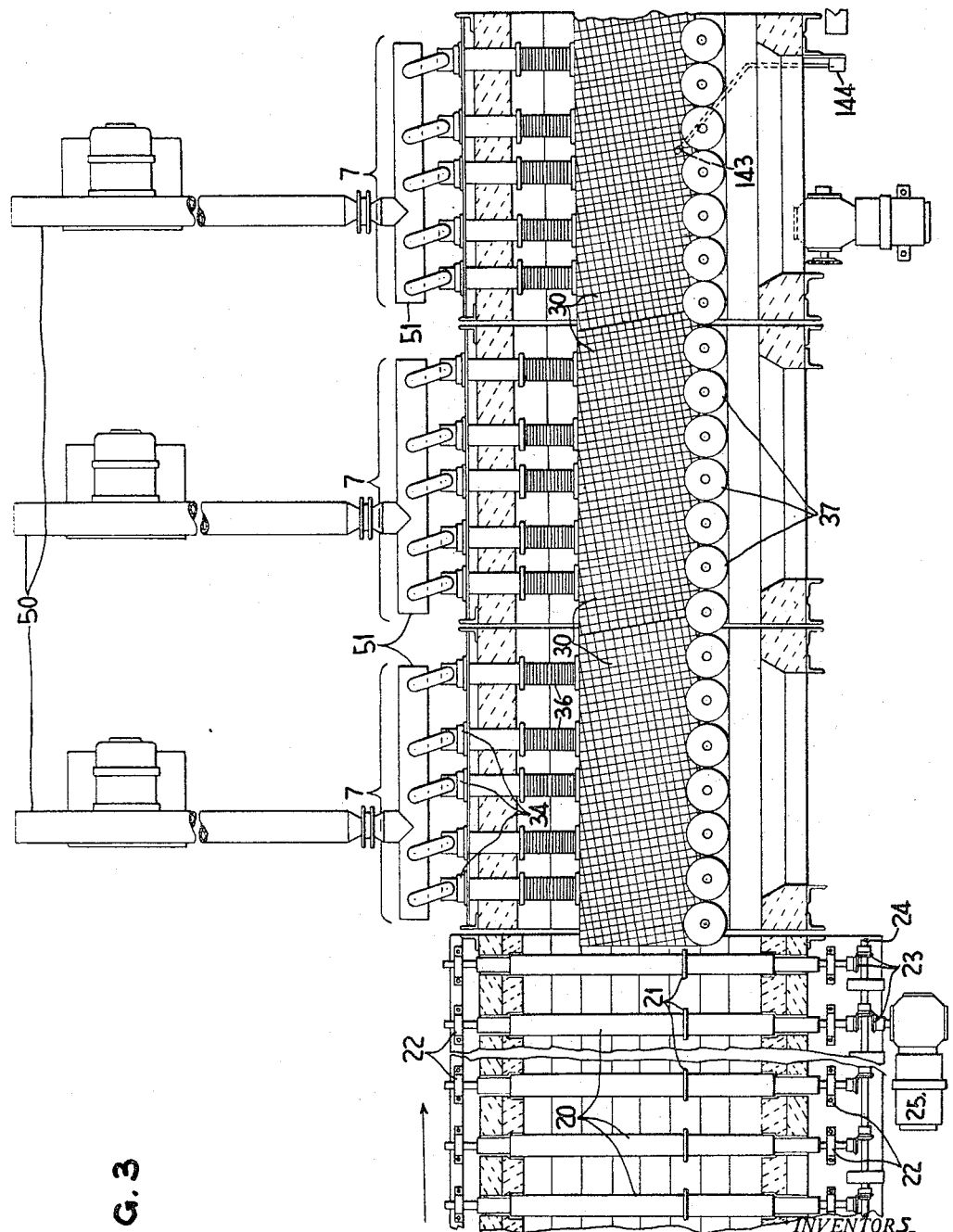
FIG. 3 is a partial plan view showing the arrangement of the preheat section with respect to gas film support heating section, the relative positions of the burners feeding combustion gases to the plenum chambers and the mechanism for conveying glass sheets by edge contact only.
Figure 4:
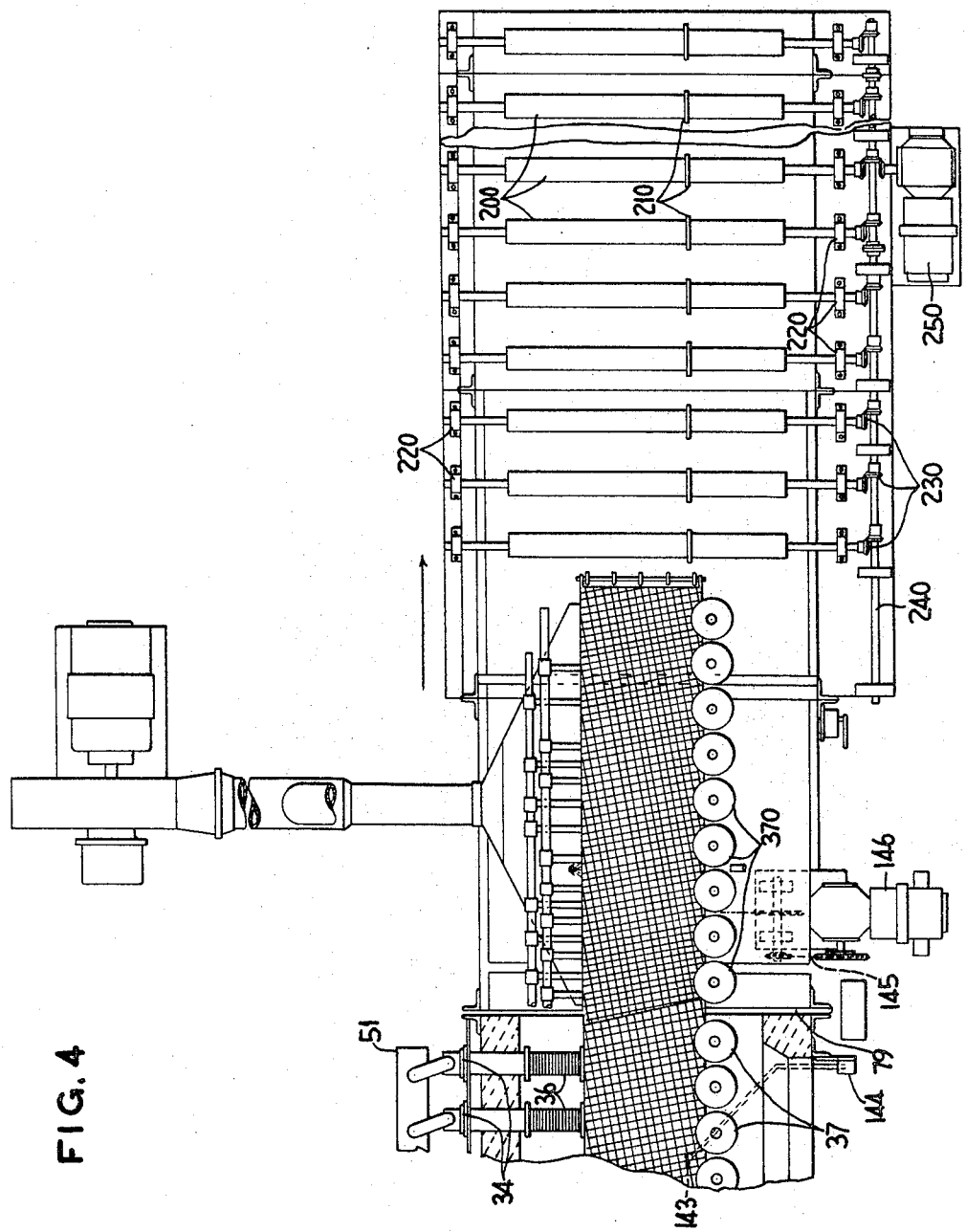
FIG. 4 is a partial plan view which is in effect a continuation of FIG. 3 and shows the terminus of the gas film support heating section adjacent the quenching section, the latter being followed by the conveyor roll run out sections.
Figure 5:
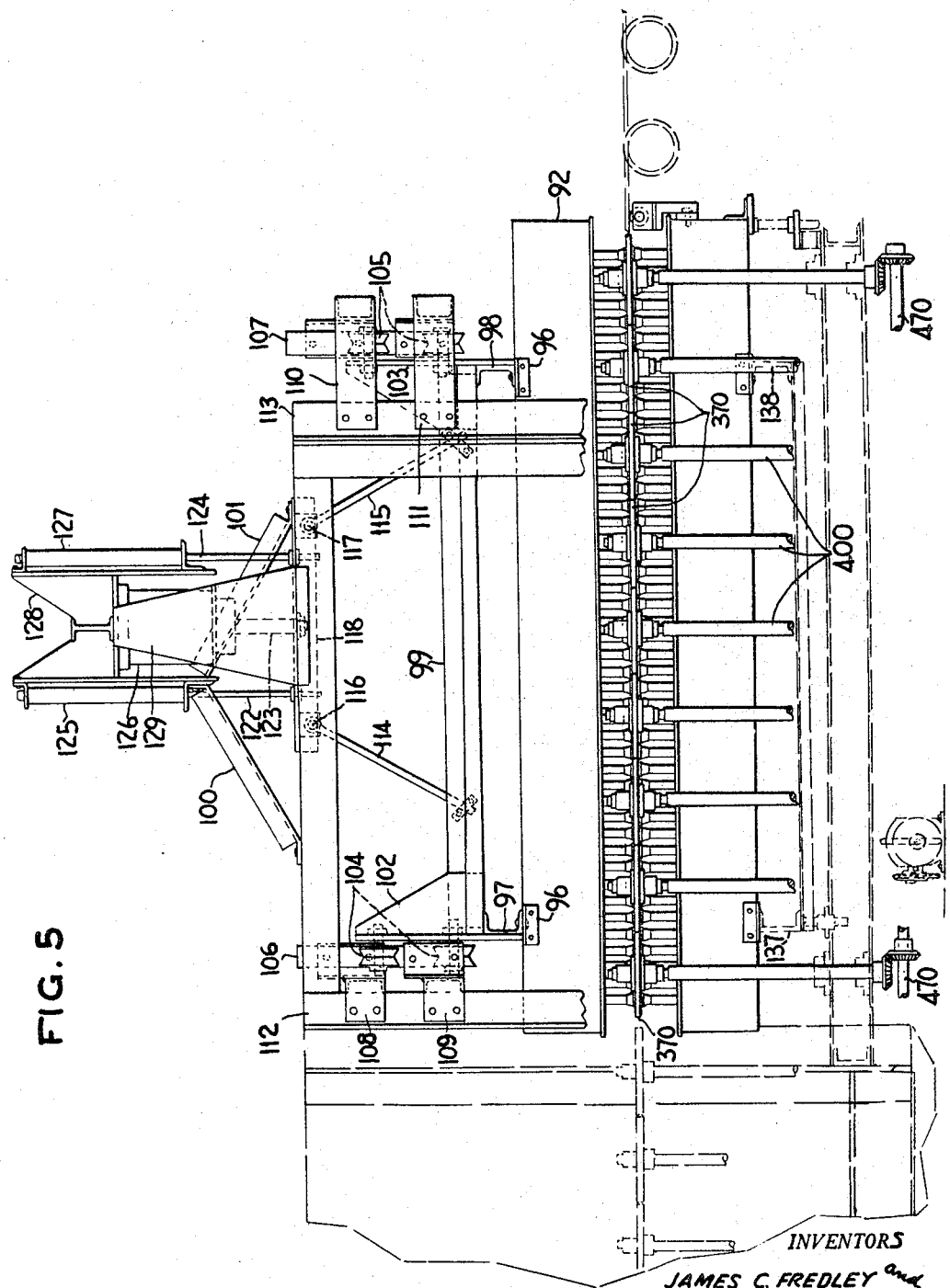
FIG. 5 is a side elevation of the quenching system showing the relationship of the upper and lower heads.
Figure 6:
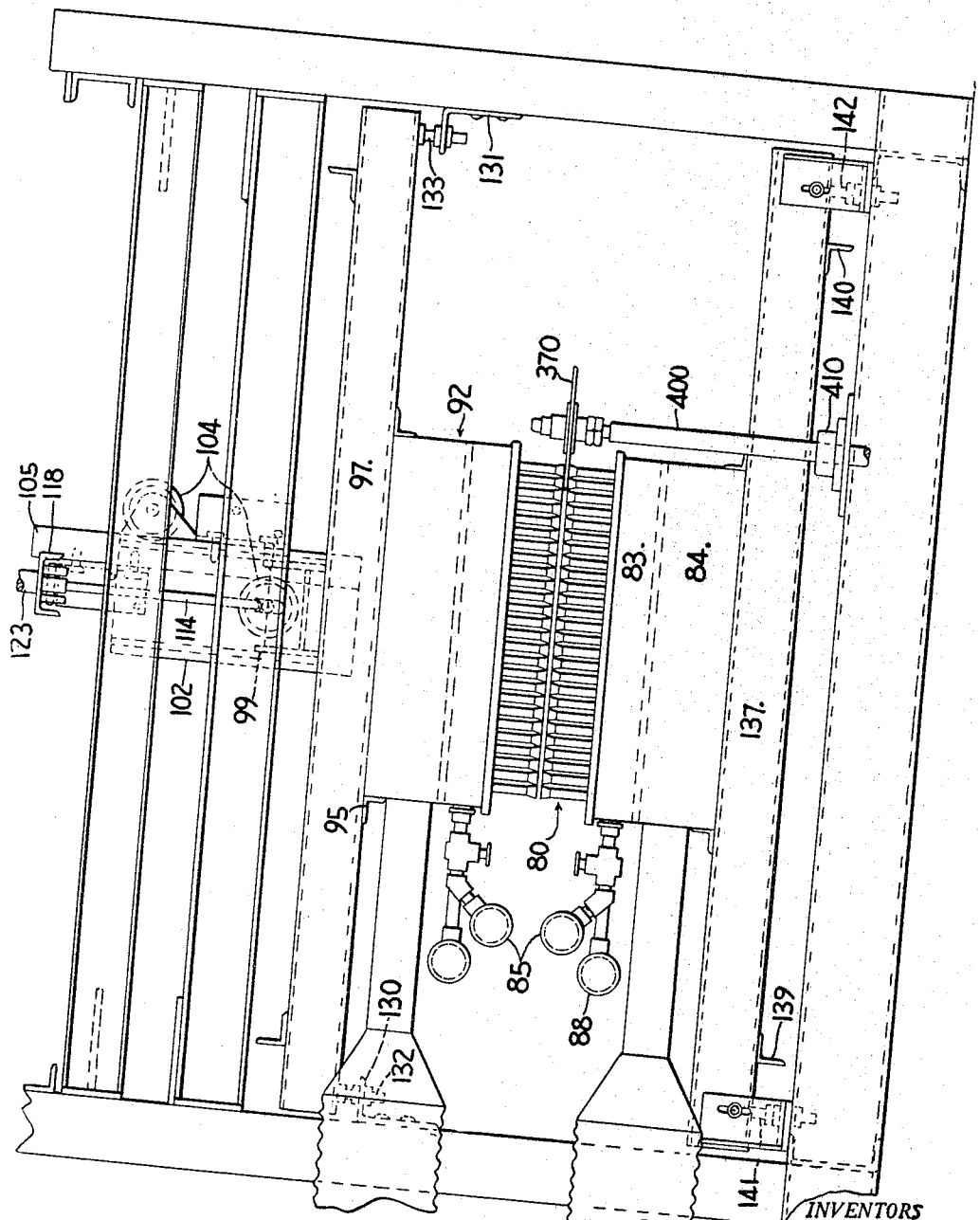
FIG. 6 is an end elevation of the system of FIG. 5.
Figure 18:
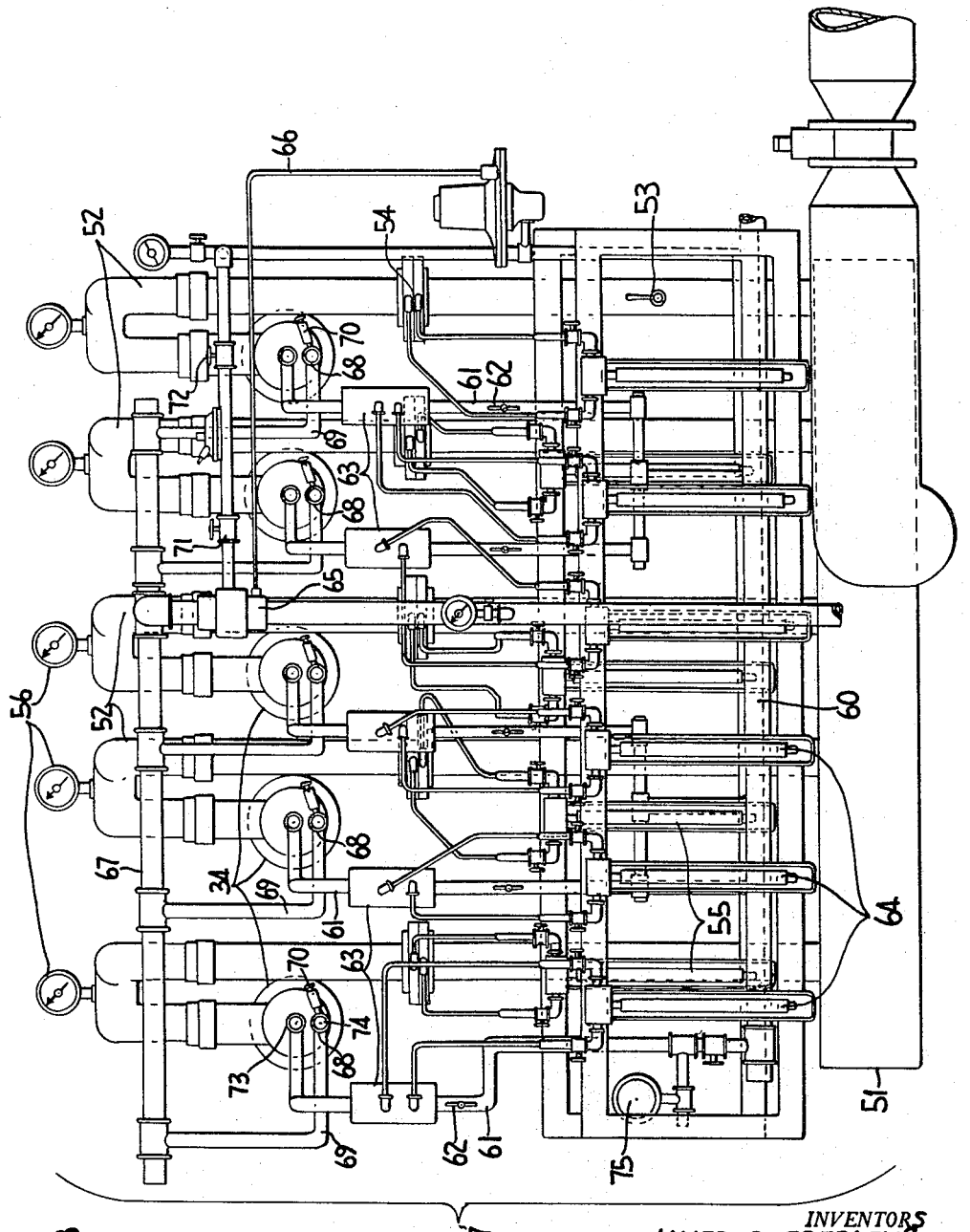
FIG. 18 is an elevation of the burners, gas and air feeds and controls for one of the three plenum chambers of the gas support heating section.

To supply air under pressure to the hot gas support combustion system, each unit 7 (FIG. 3) employs a blower 50 feeding air under pressure through a butterfly control to a manifold 51. As best shown in FIG. 18, the individual burners 34 are supplied with air from the manifold through conduits 52, each provided with a valve 53 and an orifice at 54 of known size. Pressure drop across each orifice can be measured by manometers 55 affording means to determine individual flow rates. Pressure gauges 56 permit balancing of static pressures in the air flowing to the burners.

Gas from main 60 is introduced into each burner 34 via conduits 61 each individually valved as at 62 and provided with flow metering devices 63 connected to manometers 64.

Each burner 34 is of the so-called direct fired air heater type. Air from blower 50 is tapped into premixer 65 and there mingled with gas supplied through pipe 66 from the main 60 from whence the mixture flows to a manifold 67 connected to burner pilots 68 by inlets 69. Each pilot 68 is provided with a continuous type spark plug 70 for ignition and safety against blowouts in addition to which each burner contains a glow tube (not shown) which remains incandescent during operation to sustain flame within the burner. Gas to the pilot premixer is controlled through needle-valve 71 and shut-off valve 72. Sight ports 73 and 74 permit visual independent inspection of the pilot flame and main flame, respectively, in each burner. Diaphragm type safety devices 75 act to shut off all gas and air in the event of loss of either gas or air supply pressure.

The combustion of the products in the combustion chamber produces sufficient plenum pressure to supply the modules with heated gas of a uniform temperature and pressure. Adequate control of pressure and temperature are provided by correlating the rates of input of air and fuel to the burners. To supply enough gas to effect the desired support under normal conditions, an excess of air (usually 50 percent or more in excess) over that required for the combustion of the fuel gas is used. The supply of gas may be varied to change the heat input and the supply of air may be varied to change the pressure in the plenum.

The modules and plenum chamber are in most cases made of metal, such as iron, or like material having high heat conductivity and the modules themselves are in good heat conductive relationship to the plenum chamber, being connected thereto.

FIGS. 15–17 show a module bed 76 of a curved rather than a flat contour for use in bending glass while it is supported on air film. The heights of the modules 31 from the plenum chamber 33 are selectively and progressively changed, both in the direction of glass travel and in a direction transversely thereto by reducing the depth of the module cavities in varying degrees to gradually change the surface defined by the upper termini of the modules from flat to curved. Because each module supports the overlying portion of the glass at a uniform distance from its terminus, the deformable glass will bend as it progresses, conforming to the shape of the bed.

DELIVERY SECTION

As shown in FIG. 1, the delivery roll section 4 consists of conveyor rolls 200 provided with guide collars 210 in alignment with discs 370 of the quench section to maintain the proper position of the glass during transfer therefrom. Each roll is journaled in bearings 220 and is driven through gears 230 from a common shaft 240 energized by drive motor 250.

MODULE DESIGN

In accordance with an embodiment of this invention, highly developed and refined supporting apparatus have been provided to prevent the distortion of glass at deformation temperature, an important achievement not accomplished by known conveying apparatus and processes, including known air film support devices. Specifically, it is important to have a very large proportion of the glass sheet or plate supported by a uniform force. This prohibits flowing the supporting air film across substantial areas of a supporting plate (i.e., between such a plate and the supported glass) because of the creation thereby of a progressive pressure drop along the path of flow and, hence, a nonuniform supporting force. Furthermore, air introduced from a plurality of points beneath the supported glass must be exhausted beneath the supported area rather than merely by lateral flow to the glass edges to prevent a pressure build-up centrally of the supported sheet that will cause a doming effect upon the soft glass. The gas, having exhausted to points below the modules and adjacent the stems thereof, then flows principally to the sides of the bed through the exhaust channel 77 underneath the modules, some portion of the gas exhausting through ducts 39. This channel 77 is disposed underneath the modules, the module stems 32 which extend therethrough being long enough to provide adequate height to this space.

Of course, if the support zones are small in comparison with the exhaust areas, the support pressure will not be substantially uniform. If the exhaust areas are large in magnitude, thinner sheets of glass overlying these areas will have a tendency to sag. Conversely, if the support areas are too large and exhaust areas too small, doming of the glass tends to occur. Also, the pressure differential between the supporting pressure and the exhaust pressure must not be too great in order to avoid sagging.

Finally, it is important that the support be provided by a diffused and relatively small gas flow to provide substantially uniform pressure across the width of the support zone, thereby avoiding deformation, such as dimpling, from velocity pressure due to the direct impingement of localized jets of gas against the supported glass surface. The module embodiments illustrated in FIGS. 21 to 30, 32 and 33, when assembled to form a supporting bed and suitably supplied with gas from a plenum chamber in a manner to be described in more detail, provide the uniform support required to process glass at elevated temperatures substantially free from distortion in the manner herein disclosed.

As indicated by the embodiment depicted in FIGS. 21 and 22 and shown schematically in FIG. 19, each module 31 forms an open-topped chamber, being essentially closed on its other sides, the upper terminus of which defines a zone of substantially uniform pressure (a profile of which is diagrammatically shown in FIG. 19) beneath the overlying glass. The pressure is exerted by gas supplied to each module from the supporting plenum chamber by way of the hollow supporting stem 32. A nozzle 150, in threaded engagement with an opening 162 in the base of the module 31 and having a bore 163 connected with the bore 164 of module stem 32, provides a gas inlet to the module chamber and also functions to diffuse the gas by changing the direction of flow to a horizontal direction as the gas escapes and expands into the module chamber through a plurality of bores or orifices 151 in the nozzle. The orifices 151 are so disposed to prevent direct impingement of pressurized gaseous fluid against the supported glass surface so as to prevent dimpling of the glass from the velocity pressure of a localized jet of gas. They deliver the gas to the module in a path which is initially out of the path of the glass. As shown in FIG. 22, the initial path is toward the module side wall below the upper edge thereof. However, the initial path may be downward, or as a horizontal spiral, or may be baffled or otherwise obstructed as long as it does not initially impinge against the glass. By feeding the support gas into the large module chamber through a conduit or orifice which is smaller in cross section than the module, the gas diffuses into the gas of the chamber, producing a diffused flow, thus ensuring uniform pressure across the upper edges of the module.

Pressure profiles across the upper terminus of a module may be determined in the following manner: A pressure sensing plate having a small hole therethrough is positioned above a module and spaced from the upper terminus thereof a distance corresponding to the height of a supported sheet, e.g., 0.010 inch. A pressure transducer is connected to the sensing hole and the electrical output of the pressure transducer is connected to a recorder which will graph pressure variations on one axis and displacement of the pressure sensing plate on the other axis. The pressure transducer controls the displacement of the recording device along e.g., the Y axis of the graph. A potentiometer, the shaft of which is rotated by relative horizontal movement between the sensing plate and the module, translates such movement to an electrical signal which controls the displacement of the recording device along the other, or X axis, of the graph.

Most advantageously, the relatively small size of orifices 151 of nozzle 150 provides a drop in gas pressure from the interior of the plenum to the interior of the module, and in so doing, performs three important functions: first, it prevents modules not covered by the supported glass from allowing the rapid escape of gas from the common plenum, which would reduce the pressure in the plenum and, hence, in the covered modules; second, it prevents variations of load above a module from affecting the flow of gas from the plenum into the module; and, third, it diminishes the effect of any slight variations in plenum pressure upon the pressure within the module. With this arrangement, the gap between the upperterminus of the module and the lower surface of the supported glass becomes self-adjusting to a uniform size about the entire upper periphery of the module, which size is a function of the weight of the glass supported. This occurs because the flow of gas from the plenum through the module and to the exhaust area passes through two restrictions: the orifices 151 in the base of each module, and the gap between the upper terminus of the module and the supported glass. Because the gap is normally quite large with respect to the orifices 151, there will be a substantially constant pressure drop through the orifices from the plenum to the module. The pressure per unit area of cross section across the module is, under normal equilibrium conditions, equal to the weight per unit area of supported surface of the glass which supports, the gap between the module and the glass adjusting in size (i.e., changing the height of support of the glass from the module) until this pressure is obtained. Thus, if the gap becomes very small due to a heavy piece of glass or an external force upon the glass, the pressure within the module will increase until the pressure balances the load or until plenum pressure is reached as the gap approaches zero. If the gap diminishes to zero, there is, of course, insufficient pressure to support the load. The glass will be raised from the module by the gas in the module impinging against the lower surface of the glass under any module pressure greater than the weight of the glass, thus increasing the size of the gap and reducing the module pressure. In this manner, the gap is self adjusting to a uniform size, dependent upon the weight of the glass, the plenum pressure and the size of the orifices. The rate at which the pressure within the module builds up with decrease in the gap is a function of the rate of gas flow into the module and the volume of gas in the module. Hence, the orifice must not be so small for a given plenum pressure as to restrict the flow of gas into each module to the extent that excessive time is required to increase the pressure in response to a decrease in support spacing. In most cases sufficient gas should enter the chamber within not more than one second, generally less than 0.1 second and preferably almost instantaneously to supply the required increased pressure necessary to prevent the glass from touching the uppermost module edge.

Modules of small volume are more responsive for this purpose than are larger modules for a given flow rate. Generally the modules herein contemplated have a volume below 25 cubic inches, preferably not over about 10 cubic inches and most desirably less than about 2 cubic inches. By forming the support bed from identically constructed modules and supplying them with uniform pressure, each module will support the overlying portions of the glass sheet or plate along a desired surface. The proximity of adjacent modules results in substantially uniform support under the entire area of the glass sheet to assure a product substatnially free of distortion.

As shown in FIG. 19, the gas within each module escapes across the upper terminus of the module walls to zones of lower pressure between adjacent modules. This lateral flow of gas between the module wall and the glass results in a progressive pressure drop across the width of the wall. However, the resulting area of nonuniform support pressure directly above the wall thickness and the area of reduced pressure at the exhaust zones between the modules is minimized by utilizing thin module walls (rarely averaging greater than ⅜ inch) and relatively low gas flow which permits the exhaust areas between the modules to be kept small yet adequate to exhaust the gas without building up back pressure. This is shown by the module pressure profile of FIG. 19 wherein the dips shown in the pressure profile at the exhaust areas are sufficiently small to have no adverse effect on the moving supported material. Thus, a substantially uniform average support pressure is achieved, as shown in dotted line in FIG. 19.

Each module 31 of the embodiment shown in FIG. 19 is square and exhaust radially in all directions to the surrounding zones of lower pressure, resulting in the pressure profile shown. The pressure over the exhaust areas, while lower than the support pressure, generally is slightly above ambient pressure to provide a gas flow from the supported surface to the exhaust channel beneath the modules.

The modules of the embodiments disclosed herein may vary in size, depending upon such considerations as the size of the glass sheets to be supported and the uniformity of support height desired along the dimensions of the supported glass. While square modules having outer dimensions of approximately one inch have been found to be generally satisfactory for a large range of glass sheet sizes, the module size may well vary in dimensions from about ⅛ to 2 or 3 inches on each side and need not be square, there being numerous other geometric or irregular shapes equally suitable. To achieve satisfactorily uniform support characteristics for sheets of glass or other sheet material heated to a deformation temperature, the distance across the upper terminus of each module forming the support bed should be no more than ½ of the correspondingly oriented dimension of the supported sheet and preferably should be less than ⅕ thereof. The module depth from the bottom to the open top may vary but must be substantial. Normally, it will be at least ¼ inch deep and in most cases ½ to 1 inch or more.

Figure 31:
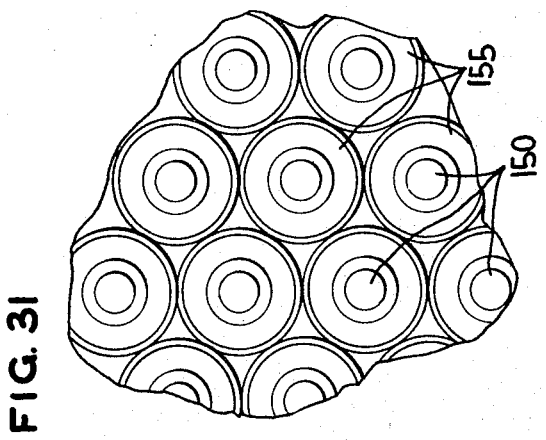
FIG. 31 is a partial plan view of a module bed of the module units shown in FIGS. 29 and 30.
Figure 29:
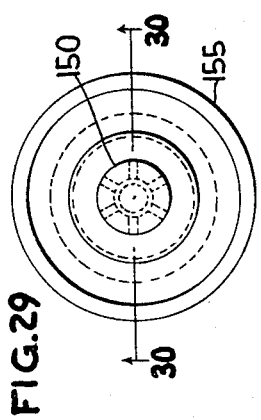
FIG. 29 is a plan view approximately double scale illustrating a support module unit having a circular cross section in the plane of support.
Figure 30:
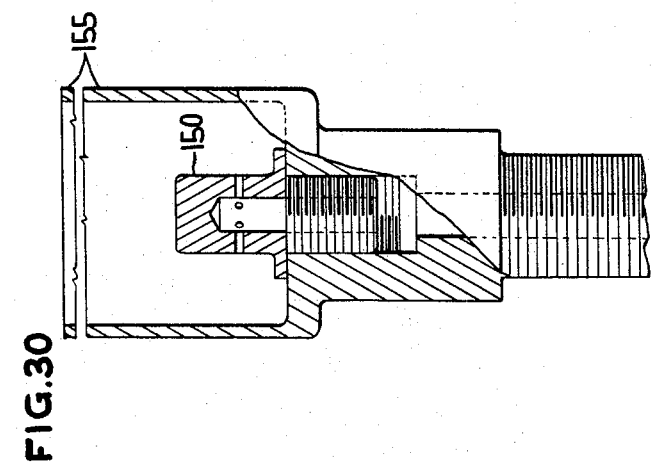
FIG. 30 is a section taken along line 30—30 of FIG. 29.

FIGS. 23 and 24, FIGS. 29 and 30, and FIGS. 32 and 33 illustrate additional embodiments of modules suitable for use in the heating section. The module 152 of FIGS. 23 and 24 is subdivided into four cavities, 152A, 152B, 152C and 152D, each of which is supplied with gas from an orifice 153 connected to the plenum chamber through hollow stem 154. Each cavity functions, in effect, as a submodule and the pressure profile across the entire internal width of module 152 is substantially flat with the advantage that support is provided as the traveling workpiece covers any one submodule and before the entire unit is covered. The module 155 of FIGS. 29 and 30 is similar to module 31 but is cylindrical in shape to provide, when juxtaposed with others upon a plenum, triangularly shaped exhaust areas between mutual points of contact, as shown in FIG. 31.

Figure 32:
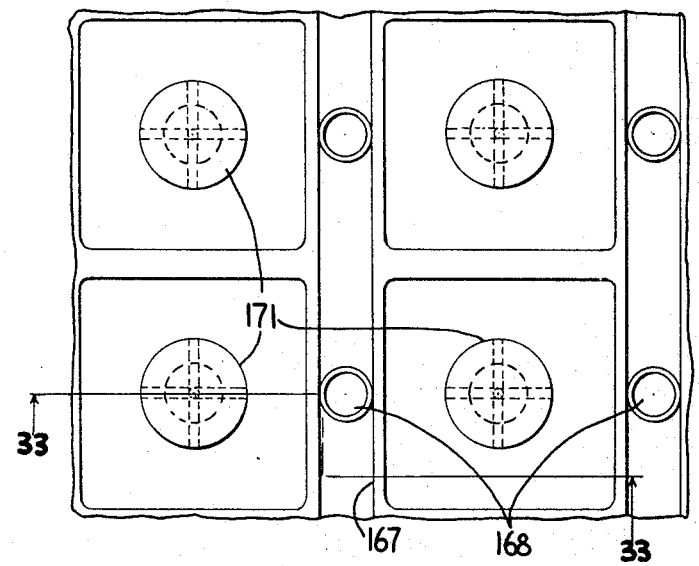
FIG. 32 is a partial plan view of support modules arranged in rows with alternate longitudinal exhaust grooves.
Figure 33:
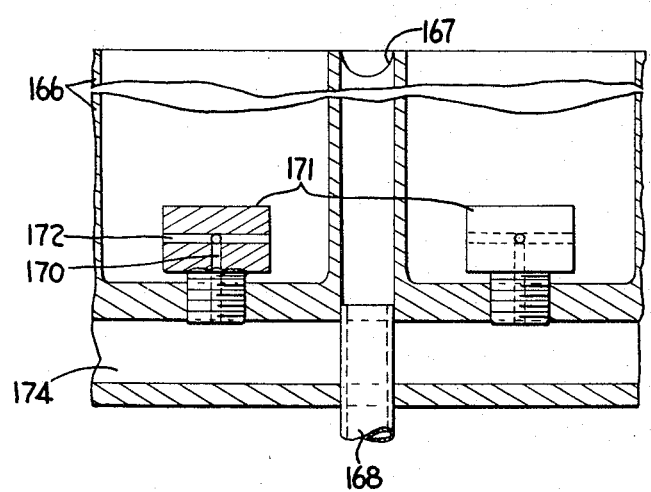
FIG. 33 is a section taken along line 33—33 of FIG. 31.

Module 166 of FIGS. 32 and 33 is similar to module 31 except that a plurality of these moduels form an integral row and successive rows are spaced, one from the other, to provide exhaust zones 167 with ducts 168 to provide communication between the exhaust zones and the surrounding atmosphere. Alternatively, the rows may be individually formed with independent plenums and spaced from each other to form exhaust zones. A bore 170 in nozzle or baffle member 171 connects four orifices 172 in the nozzle with the plenum chamber 174 to provide for the passage of gas from the plenum to the module cavity.

FIG. 20 illustrates one embodiment of a module 81 constructed to provide enhanced heat transfer characteristics for the quenching zone. This module is similar in construction and operation to the module 31 insofar as the principles of air-film support are concerned. The mass of the module wall 158 and of the nozzle 159 has been increased to locate a substantial mass of metal adjacent the supported glass while maintaining acceptable support characteristics, such as pressure uniformity.

In operation, a portion of the module stem 82 is surrounded by a heat exchange medium such as water or other fluid separately circulated through a cooling box 83 to cool the quenching modules 81 and to prevent heat distortion or to hold them at a substantially uniform temperature (e.g., plus or minus 100 degrees Fahrenheit) from module to module. Cooling gas flowing under pressure from plenum chamber 84 into the module cavities provides support for the glass in the quench zone in the same manner as the gas of the heating section provided support. The gas escapes through exhaust channel 78 between the modules and the cooling box to the edge of each quench bed. The majority of the cooling of the supported glass is acomplished by convection through the flow of gas from the module to the exhaust area; a moderate amount of cooling takes place through heat conduction from the glass, through the gaseous support medium, to the module; while very little cooling is accomplished through heat radiation from the glass to the module. FIGS. 9 and 10 illustrate similar quenching modules, each with slightly different nozzles 165 and 175, respectively, designed to position a large metallic mass as close to the glass surface as possible.

As previously explained and as shown in FIG. 9 and schematically in FIG. 20, a quench module which in essence constitutes a mirror image of the lower module is positioned above the supported glass to quench the upper surface of the glass. As shown therein, flow rates adjusted to provide equal heat transfer from each side of the glass may result in a larger gap between the glass and the upper modules than between the glass and the lower modules because the weight of the glass is supported by the lower modules. While it has been found that high flow rates generally disturb somewhat the desired static pressure characteristics of the support zones, they may be tolerated in the quench section because the presence of opposing pressure zones on each side of the supported glass counteract and hence minimize any disturbances to the glass and in actual practice maintain an equilibrium and uniform support plane.

FIGS. 25 and 26 illustrate another embodiment of a quenching module 81, similar to that of FIG. 20 in all respects except that the nozzle 160 terminates in the form of a cone to maintain a large metallic mass near the glass surface while improving the uniformity of the pressure across the module cavity and increasing the size of the cavity.

Figure 27:
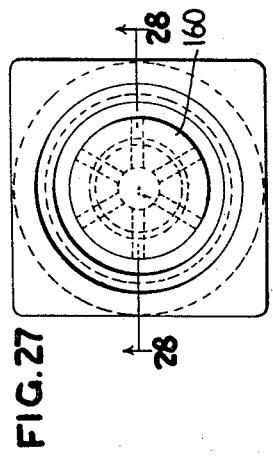
FIG. 27 is a plan view of a quenching module unit having a step in the marginal walls to enhance turbulence of the quenching gases at the gas-glass interface.
Figure 28:
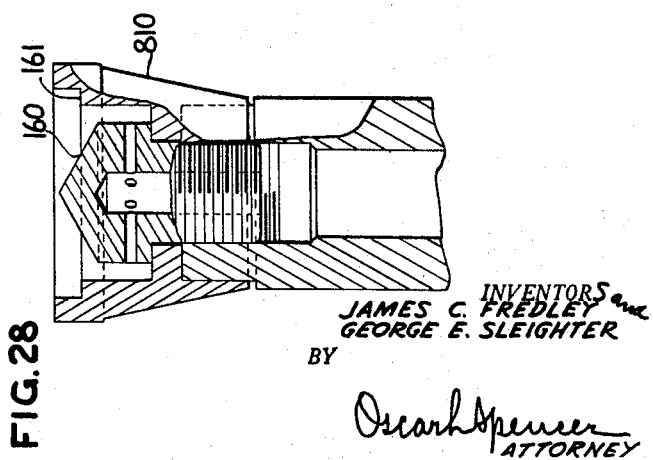
FIG. 28 is a section taken along lines 28—28 of FIG. 27.

FIGS. 27 and 28 illustrate another embodiment 810 of a quenching module which produces enhanced heat transfer characteristics by a step 161 in the periphery of the module wall. In this manner good support characteristics are maintained and high gas turbulence is produced due to the entrance effect as the gas flows across step 161 and then enters the gap between the upper terminus of the module and the supported glass. This results in more uniform and greater average cooling across the module bed. At the same time, the mass of the module is maintained relatively large to conduct heat from the modules to the water in cooling box 83 so as to maintain a uniform temperature throughout the module bed. It has been found that a turbulent flow of gas, even at relatively low velocities, becomes a dominant factor in the cooling of the glass. In fact, with the module 810 of this embodiment, convective cooling accounts for approximately eighty percent of the heat transfer from the glass and results in a substantial increase in the total cooling rate.

It should be understood, of course, that the quenching modules could advantageously be used in the heating sections of the lehr and would, due to their enhanced ability to transfer heat, aid in raising the temperature of the glass. However, the advantages of rapid heating are not comparable to the necessity of rapidly cooling the glass to produce a temper, and this, coupled with the more intricate design of the quench module and the limited materials from which to fabricate a module that must function at temperatures approaching the 1200 degrees Fahrenheit in the heating section, militate against their commercial use.

OPERATION

The following are examples, by way of ilustration only, of preferred modes of operation of the invention disclosed herein as applied to the annealing of glass sheets.

A. *Annealing*

Glass sheets one-quarter inch thick and approximately 16 inches wide by 27 inches long and having a stress of 260 millimicrons per inch, which are to be reannealed to lower the residual stress, are placed lengthwise seriatim upon the apron roll unit 5, properly aligned, and heated to 950 degrees Fahrenheit in the preheat section. Likewise, the glass sheets are transferred to and transported through the heating section in the same manner as in a tempering operation and under the same operating conditions with the exception of the temperature level and speed of travel. In the annealing process the glass is rapidly heated to a temperature of approximately 1025 degrees Fahrenheit, which is at or near the upper limit of the annealing range. For this purpose gas is introduced into the plenum chambers and emitted from the modules at a temperature of approximately 1200 degrees Fahrenheit just as in the tempering process. This heat is, of course, balanced by electrical heaters above the glass to prevent bowing. When the glass reaches 1025 degrees Fahrenheit, this temperature is maintained for approximately 60 seconds during which time the internal stresses undergo relaxation. The products of combustion introduced to the succeeding plenums and associated modules over which the glass passes from this point are reduced in temperature by a reduction in the quantity of natural gas supplied to the burners. The supply of air is increased to maintain constant plenum pressures throughout the heating section. The temperature of the gas used for support is thereby progressively decreased stepwise from plenum to plenum, as is the heat supplied by the electric heating coils above the glass, until the temperature of the glass reaches 600 degrees Fahrenheit which is below the lower limit of the annealing range. Below the lower limit of the annealing range, only temporary stress results and the cooling curve followed to room temperature is not critical. In addition, the glass has already been cooled to below its deformation temperature, and the glass is therefore conveyed directly from the last gas support heating unit to the delivery section. The stress in the glass can be lowered by this process to approximately 45 millimicrons per inch with on visible distortion or marking from the conveying apparatus.

It should be recognized that once the temperature of the glass reaches the holding temperature of the annealing process, the hot gas of the support and the upper heating elements no longer produce a net heat flow to the glass but rather selectively retard the cooling of the glass along the predetermined annealing curve. It should be understood that other annealing curves or variations in the annealing curve described may be used, depending upon the final stress desired and the time for annealing or the length of the heating section that is available.

VARIATIONS AND EQUIVALENTS REVIEWED

While the operating examples disclosed above illustrate embodiments of this invention, in many instances it is possible to alter these values or constituents or substitute equivalents therefor to obtain substantially the same results in substantially the same way to produce the same results.

Within the contemplated module and support bed design, variations in module size, construction and spacing may be made which result in a change of actual and relative support areas, module wall areas, and exhaust areas as well as in the actual and relative gas pressures utilized for support. Of course, the ultimate test of acceptable variations is the success of the arrangement in supporting glass in a uniform manner and without deformation at temperatures above the deformation temperature of the glass. Nevertheless, the following factors merit consideration in determining acceptable variations.

Deformation of the glass does not take place when the glass is heated on the system herein disclosed because adequate design of the support has been provided. Thus, support areas and exhaust areas are so interspersed that gas can be rapidly exhausted at negligible pressure drop from under the glass between the module spaces and thence through the exhaust channel 77 and ducts 39 to the sides of the glass or bottom of the furnace—ultimately to the exterior atmosphere.

The pressure drop between the exhaust and that within the module while supported by the glass generally is small, often of the order of a few ounces per square inch. The pressure is sufficient, however, to maintain the glass an adequate average distance from the upper edges of the module which should be at least 0.001 inch, preferably above 0.003 inch, above the module edge. Otherwise there is danger that the edges of the modules may occasionally contact and mar the hot glass. On the other hand, this pressure differential should not be so great as to create an average gap between the lower surface of the glass and the edges of the modules greater than 90 percent (preferably less than 50 percent when glass 1/8 inch in thickness or more is heated) of the thickness of the glass supported. This gap, as normally established, ranges from 0.003 to 0.015 inch, and in most cases (particularly in the case of glass 1/8 inch and larger in thickness) the clearance or gap does not generally exceed an average of 0.050 inch, preferably being not over 0.025 inch. Unusually good heat transfer takes place when the gap is at this spacing, the heat transfer coefficients being many times those observed with wider spacings. This is caused by a change in direction and an increase in the net average velocity of the gas flow at the peripheries of the modules relative to the previous velocity of the gas flow interiorly of the module. Such a change in direction and velocity tends to strip away the thin boundary layer of insulating air on the surface of the glass sheet, which would otherwise remain, and hence the rate of heat transfer is greatly increased.

It will be understood that the size of this gap is a function of the pressure of gas in the module and the flow rate therefrom. By holding the gap between the modules and lower surface of the glass disposed on the gas of the modules within the range specified above, the glass becomes automatically disposed at a substantially constant level above the bed without contact with the modules and without substantial flutter. Thus, as the glass approaches the module, it tends to restrict the flow of gas from the module and the pressure in the module rises above its normal support pressure toward a value of the pressure in the plenum. This tends to push the glass away from the module bed.

Conversely, if the distance between the module and the glass increases, the pressure exerted on the glass by the gas in the module falls toward the level of the exhaust pressure, thus causing the glass to fall back. Thus, the glass becomes automatically stabilized at a substantially constant level over the bed and deformation of the glass is minimized because of the intrinsic nature of the glass to seek its automatic level. This phenomenon occurs so long as the clearance between the glass and the module is held within the range specified above.

The percent of the area above the modules (including the area of the module walls and the area enclosed by the walls) within a central or support portion of the bed, based upon the area of such portion, exceeds 50 percent. However, the area above the exhaust zones of such portion (the exposed area which is outside the outer edge of the module walls) is above 5 percent based upon the area of such portion. Adequate exhaust as well as adequate support is provided.

Supply of the gas to the module is effected under conditions (e.g., by feeding the gas through orifices as heretofore described) such that the ratio of pressure drop between the plenum chamber or gas reservoir and the modules supporting the glass to the pressure drop between such covered or glass supporting module and the exhaust spaces is held high being above 2, preferably above 3 and in most cases above 5. In the specific embodiment described above, the ratio is about 21.

By maintenance of this ratio, several advantages accrue. Any pressure exerted by the glass tending to restrict flow of gas from the module automatically causes the module pressure to rise above its normally established low pressure toward the higher plenum pressure, thus forcing the glass away from the module and restoring normal flow. On the other hand, maintenance of the substantial pressure drop between the plenum and the module permits the module pressure to be low and eliminates any tendency for establishment of high speed jets of air from modules which are unloaded. That is, by imposing substantial restrictions (or pressure drop) in the gas conduits between the modules and the plenum chamber, there is little difference in the flow of gas through unloaded and loaded modules. Hence, as the glass passes over the modules, it is promptly and effectively provided with support, but the supporting force is so uniformly available over all of the modules that there is no appreciable tendency for the gas escaping from an unloaded module to raise an edge of the glass and thus cause the glass to teeter or flutter as the edge begins to move across an unloaded module. Furthermore, by supplying gas from a plenum under higher pressure to the low pressure support zones, fluctuations in pressure over the bed and/or during operation are minimized.

Considering the entire support system, it is apparent that it provides a plurality of support zones which are spaced from other such zones in all directions across the bed. The individual modules which provide a supply of supporting gas are separated in all directions from other such support areas by solid partitions, i.e., the walls of the module, which restrict lateral flow of the support gas. On at least a portion of their sides, they are separated by exhaust spaces. Thus, in the case of the illustrated one-inch square modules heretofore described, the modules are surrounded by exhaust spaces. This provides a very uniform support system.

As shown in FIGS. 32 and 33, the modules may be in a series of rows in which adjacent modules in the rows abut, either having abutting walls or having a common partition or wall. In this case, the exhaust areas are disposed only on two sides of the support areas.

It will be recognized that the particular orientation of the module rows relative to the path of glass travel in the preferred embodiment may not only be varied with respect to the angle at which the rows are disposed, but may also be varied in other manners to achieve the desired uniform treatment of the glass. Thus, rows of modules, such as those formed from modules surrounded by exhaust spaces or from those having a common wall, such as shown in FIGS. 32 and 33, may be arranged normal to the path of glass travel but with the individual modules progressively offset from one row to the next. With this arrangement, as with that described in the preferred embodiment, any given portion of the sheet of glass passes across noncorresponding portions of the pressure and exhaust zones in adjacent rows. Thus, a straight line taken in the direction of travel of the glass will cross successive module chambers in adjacent rows at different distances from a corresponding portion of the periphery of each chamber. In this manner, any one portion of the glass sheet can be subjected to a progressively changing relationship with respect to an underlying module. The degree of offset of the module walls, from one row to the next in the direction of glass travel, should be such that the pattern of modules is nonrepetitive in that direction for a distance of at least two rows and preferably for a distance of at least five rows.

The size of the individual support areas is small with respect to the bed and also with respect to the glass to be supported. Thus, the maximum dimensions of a support area from one side to an opposed side, both in the direction of the path of the glass and normal thereto, rarely exceeds an average of three to four inches, and usually is below an average of 2 inches, even when large sheets are supported. On the other hand, the minimum of such dimensions measured in the same directions is rarely below ⅛ inch. Further, these maximum dimensions are not over one-half the width of the width of the glass measured in the same direction, and preferably are less than 20 percent, usually being below 10 percent, of such width. As previously mentioned, the volume of these zones generally is low in order to make the zone more responsive to variations in the gap between the glass and the upper terminus of the module walls. The modules have substantial depth, normally at least ¼ inch, and in most cases ½ to 1 inch or more. The gas is introduced into the lower part of the module to ensure diffusion.

The spacing between the modules or support areas is small with respect to the size of the support areas, the average spacing in the path of the sheet and also normal thereto generally being less than one-half, preferably less than one-fourth, the average width of the support areas (measured from outside wall to outside wall of the area or module) when glass having a thickness up to ½ inch is treated. With thicker glass this spacing may be somewhat greater.

Further, the respective support areas are disposed so that average exhaust spaces between such support areas, measured in the direction of the path of glass and normal thereto, are less than one inch, usually being about 1/32 to ½ inch.

The supporting gas supplied to the modules in the heating section is provided by burning a carbonaceous fuel, such as methane, in an excess of air, enough excess air being used to supply the amount of supporting gas required. Thus, the supporting gas constitutes a mixture of carbon dioxide, nitrogen, and water vapor. The temperature of the products of combustion will be below 2000 degrees Fahrenheit, usually below 1500 degrees Fahrenheit, and preferably between 1200 and 1300 degrees Fahrenheit.

Other gases may be used. Thus, air may be preheated and fed to the modules. Alternately, steam and air may be mixed and so used or the supporting gas may consist substantially wholly of hot air, superheated steam or carbon dioxide.

The particular nozzles disclosed herein have a plurality (4 to 6) of bores which discharge into their respective modules or compartments. It is to be understood that the number, size and direction of the bores or orifices may vary, as long as the desired pressure drop is obtained and the gas is emitted in a direction which prevents direct impingement thereof on the glass surface being supported from the point of entry of the gas into the module. Thus, the gas is fed into the module toward the bottom or sides or in other directions so that the stream is baffled, diverted, deflected or diffused before it impinges against the glass. Vertically or horizontally disposed baffles or gravel, sand, balls or like packing may be placed in the module to obstruct the flow of gas and produce substantially uniform pressure of the gas against the module across its width and to avoid establishing localized jets which are smaller in cross section than the module interior.

Various module shapes may be provided which are suitable for the purposes disclosed herein without departing from the teachings. Thus, while square and circular shapes have been disclosed, modules of hexagonal, octagonal, elliptical or even spiral shape, to mention only the most obvious variations, would function in the same manner.

We claim:

1. A method of annealing glass which comprises establishing a gas support path supplying gas at progressively lower temperatures to successive sections of the path, the gas supplied to the first of said sections being near the upper limit of the annealing range of the glass, the gas supplied to the last of said sections being not over the lower limit of said range, and moving the glass at an initial deformation temperature over said path and thereby cooling the glass over the annealing range.

2. A method of annealing glass which comprises establishing a glass support path supplying gas at progressively lower temperatures from about the upper limit to about the lower limit of the annealing range to successive sections of the path and moving the glass over the path.

3. The process of claim 2, wherein the temperature of the gas support path is 1025° F. to 600° F.

4. The process of claim 2, wherein the glass is passed between a downwardly directed flow of cooling gas and an upwardly directed flow of cooling gas, said upwardly flowing flow providing the gas support path.

References Cited

UNITED STATES PATENTS

| 820,205 | 5/1906 | Keighley | 65—176 |
|---|---|---|---|
| 3,223,501 | 12/1965 | Fredley et al. | 65—25 |
| 3,223,506 | 12/1965 | Wheeler | 65—348 X |

DONALL H. SYLVESTER, *Primary Examiner.*

A. D. KELLOGG, *Assistant Examiner.*